April 6, 1954     C. L. GRANDSTAFF     2,674,177
RECIRCULATING ENTRAINMENT DEVICE
FOR FORCED AIR HEATING SYSTEMS
Filed Aug. 4, 1951
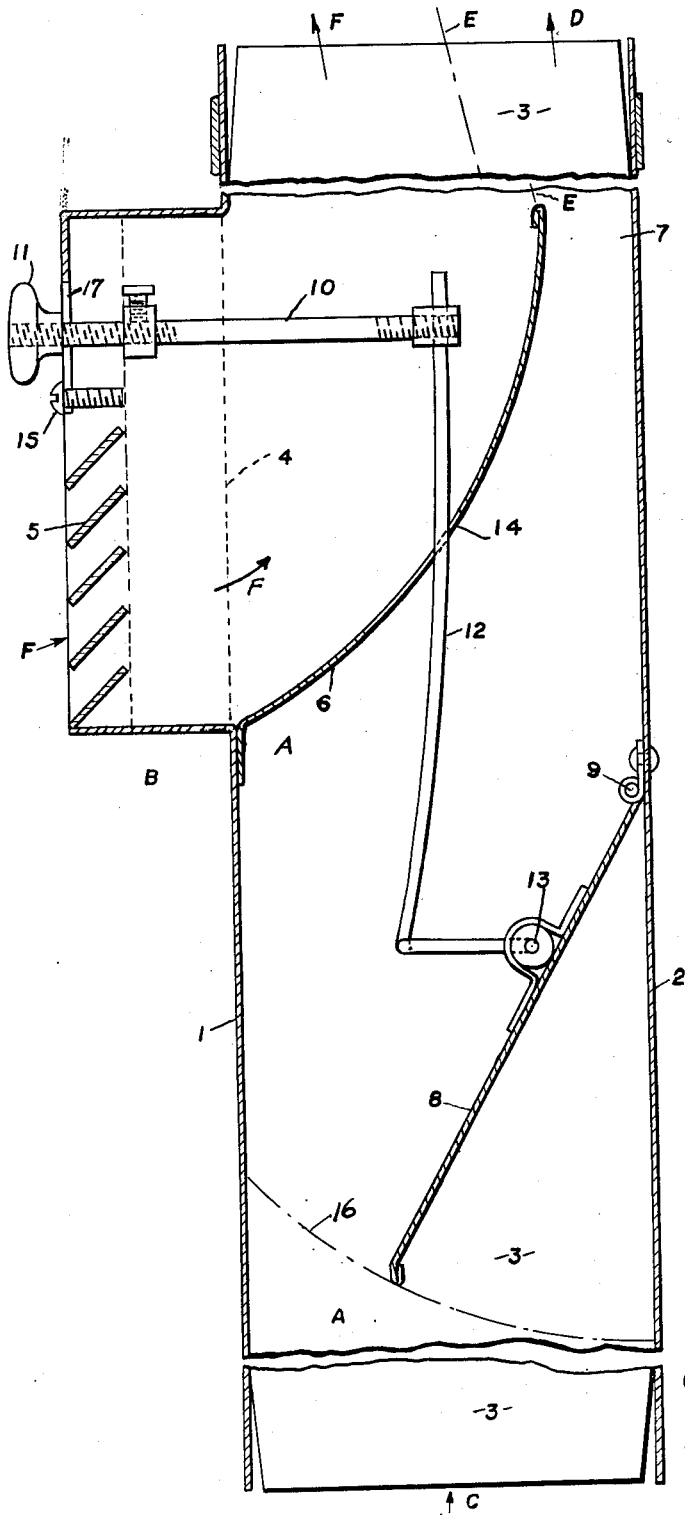
INVENTOR.
Clarence L. Grandstaff
BY

UNITED STATES PATENT OFFICE 2,674,177

RECIRCULATING ENTRAINMENT DEVICE FOR FORCED AIR HEATING SYSTEMS

Clarence L. Grandstaff, Elyria, Ohio, assignor to The C. A. Olson Manufacturing Company, Elyria, Ohio, a corporation of Ohio Application August 4, 1951, Serial No. 240,426

1 Claim. (Cl. 98—38)

This invention relates to forced warm air heating systems of the type wherein at least one space to be heated thereby is provided with at least one duct served at one end with hot air at a substantial pressure, as from a central furnace with blower, has adjacent its opposite end a warm air outlet to such space, and has a lateral opening adjacent its inlet end, in communication with the space.

A purpose of such a system type is to prevent stratification in the space served, and the duct under consideration may be a riser duct having upward flow therein, as served by a furnace located in a basement, or it may be a down draft duct, as served by a furnace located in the attic.

If the duct be a riser duct, its outlet opening is located adjacent the ceiling of the space, and with its lateral opening substantially therebelow and adjacent the floor or baseboard of the space. On the other hand where the duct is employed with down draft, its outlet end is arranged to discharge into the space adjacent the floor thereof and its lateral opening is substantially thereabove, adjacent the ceiling of the space.

In either event stratification within the space is avoided since, as will hereinafter appear, air flow is induced from the space into the duct by way of the lateral opening, by flow through the duct of the hot air entering its inlet end under pressure, which warm air entrains the air from the space at one elevation and returns the same to the space at another elevation, thereby preventing stratification within the space.

Thus, if the duct be a riser, it is provided with means whereby in operation air is caused to recirculate in the space, with flow into the duct by way of its lower, lateral opening with entrainment in the hot air stream thereadjacent, commingling with the hot air as it rises in the duct, the mixture at the thereby modulated temperature emerging into the space at the elevated duct outlet.

Both riser and down draft duct arrangement being known to the art in the general type of system under consideration, and the invention herein being equally applicable to both arrangements, for convenience in terminology, a riser duct arrangement will be specifically referred to hereinafter in the specification and claim; but it is to be appreciated that the same parts, in upside down arrangement would cooperate as well in principal functions were their disposition reversed, and therefore upside down of that specifically disclosed.

A principal object of this invention is to improve the efficiency of that section of the duct, adjacent the lateral opening through which air is induced for recirculation by entrainment, entrainment is accomplished, and preferably control is had as will hereinafter appear; to the ends that structure is simplified, and maximum induction and thereby recirculation had, together with minimum restriction of flow of the forced hot air.

Further objects and advantages will be apparent from the following description, together with the accompanying drawing which is a somewhat conventionalized view of a pertinent section of a riser duct in vertical disposition as employed in use, generally in typical sectional elevation as to entrainment parts and in elevation as to principal control parts.

With reference now to the drawing, A represents generally the portion of the riser duct under consideration, rectangular in transverse section, with a front wall 1 and rear wall 2 interconnected by a pair of side walls 3. As is usual in the art, the transverse dimension of the front and back walls may be several times that of the side walls 3, so that the riser may be located within one of the walls of the room or other building space to be served.

The section under consideration may be provided at its upper and lower extremities with means for connection to other units to form the riser, so that this particular section may be conveniently manufactured and shipped as a unit, or the parts under consideration may be otherwise incorporated in the riser duct to form a part thereof.

According to this invention the section or unit is provided with a rectangular lateral opening 4 in its front wall 1, which opening preferably and as here indicated is provided with framed grille means 5, both substantially of full width.

A curved partition 6 is arranged between the side walls 3 to extend from the lower extremity of the opening 4 rearwardly and upwardly to a location spaced somewhat from the rear wall 2 of the duct to provide thereadjacent a nozzle 7, the mouth of which is at the level of the upper extremity of the opening 4 and extends the widths of the duct.

What has thus far been described includes the entrainment portion of this invention, by which recirculation in the space served is had in the following manner.

The riser section is installed within or preferably adjacent a wall of the space B to be heated, so that its opening 4 is in communication with such space at a low elevation therein, and the riser portions not illustrated extend above those portions illustrated, to an outlet into said space adjacent the ceiling thereof, and preferably facing the same direction as the opening 4, as is usual in the art.

Forced hot air at substantial pressure and high temperature is supplied to the lower extremity of the riser, as indicated at C, as by a suitable connection from a central furnace. The nozzle 7 formed by the partition 6 increases the velocity of the hot air stream and produces an upward jet D from the nozzle mouth, as indicated by the broken line E. This jet is adjacent the back wall 2 of the duct, extends entirely crosswise between the side walls 3 of the duct and flows divergently from the nozzle toward the front wall 1 of the duct, not meeting such front wall, however, until it is at a very substantial elevation above the opening 4.

The front face of the jet thus has a very great area all of which is exposed to a corresponding area of air in communication with space B by way of the opening 4. This great area of contact between the two sources of air, is effective for equally great entrainment of the space air by and in the hot air of the nozzle jet, thereby inducing a correspondingly great flow of air from the space B by way of the opening 4, as indicated by the arrows F, the opening 4 being at a low elevation in the space served, the induced stream F is at a low temperature. As it commingles with the jet D of hot air, equalization in temperature is had, so that the temperature of the composite stream which emerges from the top of the riser duct into the space served, is at a lower temperature than the hot air by which the riser duct is served, but at a substantially higher temperature than that at which air enters the duct by way of the opening 4.

Also, the velocity of the composite stream is very substantially lower than that prevailing at the mouth of the nozzle 7. Thus, as will be apparent by one familiar with the art, temperature differential between floor and ceiling in the space to be heated is greatly reduced by the recirculation, yet the velocity of heating air within the space does not exceed reasonable limits, although the velocity of the forced warm air supplied to the riser duct may be very substantial.

It will be noted that by the arrangement described, heat exchange between the hot air and recirculating air streams takes place commencing at the upstream or lower extremity of the partition 6, so that corresponding tendency to uniform temperature of the composite stream emerging into the space served, is enhanced.

Also, it is to be noted that the disposition of the partition 6 is such as to reject any solids or liquids which might find their way through the grille 5.

The invention also includes means for controlling the flow through the riser duct.

Such means includes a damper 8, located below the partition 6 and consequently streamwise ahead of the nozzle 7, and hinged to the back wall 2 of the duct section as at 9. The damper extends substantially between the side walls 3 but with sufficient clearance therefrom to permit adjustment on its hinge 9 between full open position against the back wall 2 and full closed position against the front wall 1, as indicated by the broken swing line 16.

For control of the damper 8, a member 10 is mounted in any convenient manner as by slot 17 in the face of the grille 5 to be vertically adjusted thereon, and securable in adjusted positions, as by a hand nut 11. The member 10 extends within the curve of the partition 6 and carries a member 12 secured, as at 13, to the damper 8. The member 12 extends through a slot or other opening 14 provided for its clearance in the partition 6. As here indicated, the member 12 has rigid connection with the member 10, hinged connection at 13 with the damper 8, but in itself has sufficient flexibility to accommodate the angularity produced at its lower end by the swing of the damper; spring wire being satisfactory for the purpose.

Permitted adjustment of the member 10 may be sufficient that the damper 8 be adjustable between full on or off positions. Or the damper may also be employed in initial balancing of the system by provision of a stop, conventionally indicated by the screw 15 to limit the adjustment in damper-opening direction.

By the damper arrangement disclosed, the damper has compact relation to the partition 6 and might in fact be located much closer to the partition than as here illustrated.

Also, in any adjusted position of the damper, full wipe of the hot air stream against the partition 6 is had, with consequent heat exchange through the partition, as above described.

As hereinabove stated, while a riser duct arrangement has been specifically illustrated and described, and for convenience terminology consistent therewith employed in the specification and following claim, neither the invention nor the claim are to be considered as limited in scope thereby; since the invention would be equally applicable in a duct arranged for down draft operation, simply by disposition of the parts upside down as will be apparent.

I claim:

A device of the class described, for use in a forced air heating system by employment in a riser duct thereof substantially below the duct outlet, to provide controlled recirculation of air in the space served by said duct, said device comprising: a duct section having, when disposed as to be used, its bottom open to receive hot air under pressure, its top open for connection in said riser duct for delivery to said outlet thereof, a front opening for communication with said space, a partition extending from the lower extremity of said front opening inwardly and upwardly to a location adjacent the rear wall of said section, to there provide a laterally extending nozzle for entrainment in the stream therefrom, of air induced thereby from said space by way of said front opening, said duct section having a damper hinged to said rear wall for swinging adjustment therefrom to positions below said partition, to limit flow of hot air to said nozzle and to cause permitted flow to wipe said partition, and means for adjusting said damper by way of said front opening.

References Cited in the file of this patent
UNITED STATES PATENTS

| Number | Name | Date |
|---|---|---|
| 1,296,968 | Klein | Mar. 11, 1919 |
| 1,832,638 | Kitchen | Nov. 17, 1931 |
| 1,878,012 | Stacey, Jr et al. | Sept. 20, 1932 |
| 2,345,537 | Keep | Mar. 28, 1944 |
| 2,348,127 | Grimes | May 2, 1944 |
| 2,406,643 | Spieth | Aug. 27, 1946 |
| 2,429,619 | Hamblin | Oct. 28, 1947 |
| 2,613,587 | MacCracken | Oct. 14, 1952 |